Patented Feb. 13, 1951

2,541,726

UNITED STATES PATENT OFFICE 2,541,726

PRODUCTION OF STREPTOMYCIN

Paul Chandos Trussell, St. Laurent, Quebec, Canada, assignor, by mesne assignments, to Ayerst, McKenna & Harrison Limited, New York, N. Y., a corporation of New York No Drawing. Application November 27, 1946, Serial No. 712,735. In Canada November 30, 1945

4 Claims. (Cl. 195—80)

Introduction

This invention relates to the production of antibiotic substances by the growth of the microorganism *Actinomyces griseus*, and more particularly to improvements in the culture of this organism to increase the yield of such substances.

The culture of *Actinomyces griseus* in producing an antibiotic substance was described in the article A. Schatz, E. Bugie and S. A. Waksman, Proc. Soc. Exp. Biol. and Med. 55:66, 1944. The medium employed consisted of glucose, meat extract, peptone, sodium chloride, and water. Later, S. A. Waksman, E. Bugie and A. Schatz, Mayo Clinic, 19:537, November 15, 1944, disclosed that the synergistic effect of all the constituents of the medium was necessary for producing optimal antibiotic activity. The second article mentioned that corn steep liquor could be used as a substitute for the meat extract, but that all the other constituents of the conventional medium must be present as well.

Applicant's discovery

The applicant has now discovered that a surprising synergistic effect, in producing antibiotic substances, is provided by a culture medium for *Actinomyces griseus*, embodying corn steep liquor and soy bean material, without animal proteins or protein hydrolyzates (such as meat extracts or peptones) which have always been considered necessary members of the conventional medium, provided that steps are taken to adjust the pH to a predetermined level during the fermentation. Using the synergistic effect of this new combination of constituents, not only can the potency of the culture be increased, but the fermentation time can be reduced. This synergistic effect could not be foreseen from the teachings of the articles referred to above in which the corn steep liquor alone is used with the conventional culture medium constituents.

According to the present invention, the medium is buffered to maintain the pH within the range from 6 to 9. The applicant has found that, when using the new medium in deep culture, there is considerable acid production during the early stages of fermentation. This circumstance is contrary to the information conveyed by the aforesaid articles, which would lead to the belief that a somewhat different metabolism effect is produced by a culture medium using corn steep liquor as a substitute for meat extract. The publications indicated that difficulty was experienced in preventing the culture from becoming alkaline, and that this presented a serious problem in producing an optimum yield of the antibiotic substance. In accordance with the present invention, the natural tendency of the deep culture to become acid overcomes this problem, and makes the adjustment to conditions conducive to optimal yields of antibiotic substances possible by the addition of the buffer. As a buffer, calcium carbonate is particularly suitable, since the neutralization of the acids formed during the fermentation is continuous and automatic, and any excess buffer remaining at the end of the fermentation period is removed with the fungus thallus, for example, by centrifugation or by filtration. Moreover, the calcium apparently has no deleterious effect on the production of the antibiotic substances.

The applicant has also found that, with the new medium, it is necessary to provide effective aeration. These aeration conditions, which normally exceed those for previous media, function to produce confluent growth and metabolism of the organism and at the same time, to remove undesirable products of the fungus metabolism. Ammonia is one such undesirable product.

Despite the tendency of the culture to become acid during the earlier stages of the fermentation, to counteract which the applicant provides for the buffering of the medium, there is still a tendency for the culture to become alkaline in the later stages of the fermentation, which the applicant has found is as the peak of antibiotic activity in the culture is reached. So the applicant prefers to harvest the antibiotic substance before the pH of the culture exceeds about 9.

Having regard to the foregoing, the invention resides in the culture of *Actinomyces griseus* on a new medium and under newly established cultural conditions, as aforesaid, and as will become more fully apparent from the detailed description to follow. Objects of this invention are the provision of a new and more effective combination of ingredients as a medium for the production of antibiotic substances, and of good conditions for the use of such a medium.

Preferred procedure

A preferred procedure for carrying out the invention is as follows. The vessel employed is a deep culture fermentor equipped for aeration and agitation. A medium is prepared as herein described and introduced into the vessel and sterilized. The medium is then inoculated with a specially selected high-producing strain of *Actinomyces griseus*. The concentration of the inoculum is somewhat arbitrary but the applicant likes to use from about 1% to about 10% by volume of the medium. The inoculum employed is preferably the whole liquid culture, including thallus, etc. Fermentation is caused to proceed at slightly elevated temperature preferably within the range from about 22° C. to about 35° C. with aeration effective to cause confluent growth of the organisms during the course of the fermentation. An anti-frothing agent, for instance, a solution of a higher alcohol in an oleaginous medium is introduced periodically in sufficient quantity to subdue frothing.

The time of fermentation will vary depending on the particular conditions employed. The antibiotic substances can be harvested in good yield at any time from 40 hours upwards to about 120 hours. But, of course, the applicant's attempt is to reduce the time as much as possible without reducing the yield, and in this connection, the applicant teaches herein the means of producing antibiotic substances in high yield, within a preferred period from 60 hours to 100 hours. The pH at the start of fermentation is desirably adjusted within the range from about 6 to about 9 and preferably close to neutral, for instance, about 6.5 to about 7.5, and maintained within the range from 6 to 9 during the fermentation.

The resulting broth is concentrated by conventional methods, as for instance, by centrifugal separation or by filtration. The applicant has found that this concentrated broth can be treated to produce therapeutically useful antibiotic preparations. For instance, in one procedure, the concentrated broth is adsorbed on activated carbon and the activity eluted with an aqueous-acid or alcohol-acid solution to form an eluate containing the antibiotic substance. The acid is removed by neutralization, for instance, with an anion exchange resin such as "Amberlite IR4," the neutralized eluate concentrated, diluted with water, and the activity obtained by precipitation with phosphotungstic acid. The decomposition of this phosphotungstate yields the antibiotic substance in a therapeutically useful form. This procedure is described in the co-pending application of Richardson and Grant, Serial No. 621,388, filed October 9, 1945.

Composition of media

One of the applicant's preferred media, described in more detail, is made up as follows:

| | Per cent |
|---|---|
| Glucose | 1 |
| Corn steep liquor ("Staley No. 14") | .5 |
| Soy Flour ("Livingston" brand of the Dominion Linseed Oil Co. Ltd.) | .6 |
| Sodium chloride | .5 |
| Sodium nitrate | .1 |
| Calcium carbonate (buffer) | .3 |
| Water | Balance |

The concentration of the corn steep is by volume, and that of each of the other constituents by weight of the medium.

Corn steep liquor

The corn steep liquor is a culture medium constituent which is available commercially, and the term "corn steep liquor" is used herein in the sense employed in the art. Broadly, this is the liquid resulting from the steeping of corn or other Graminaceae equivalent for the purposes of this invention. One way in which so-called corn steep liquor is commonly made is as follows. Comminuted dried grain is treated with a weak solution of sodium bisulphite. This treatment breaks down the structure of the comminuted grain, freeing the oil, which floats to the top of the liquid, and the heavy solids which sink to the bottom of the liquid. The oil is removed from the top of the liquid and the supernatant then removed from the solid residue at the bottom and concentrated. This concentrated supernatant is termed "corn steep liquor."

One specific corn steep liquor which the applicant employs is mentioned in the example. This is known as "Staley Special Nutrient No. 14." This is understood to be a corn steep liquor having a solid content of about 62% by weight and is obtained at the present time from the A. E. Staley Manufacturing Co., Decatur, Ill., U. S. A. Another corn steep liquor which the applicant has used, is obtained from the Canada Starch Co. of Cardinal, Ontario, Canada, and which contains about 72% solids. Both of these corn steep liquors have proved advantageous in conducting the procedures described herein.

For good results in antibiotic production, the concentration of corn steep has to be selected from a range effective for the growth of *Actinomyces griseus* with the concomitant production of an antibiotic substance. This does not necessarily follow the range effective in the growth of other organisms, and it was highly unexpected for the applicant to find that such a low concentration could be used. In fact, the use of concentrations which had been found effective in growing other organisms were unsuitable for the present purposes, particularly having regard to other aspects and conditions involved.

With this in mind, the applicant prefers that the corn steep be kept within the range from about .1% to about 1% by volume of the total medium.

Soy bean material

The soy bean material which the applicant prefers to use with the corn steep is a comminuted soy bean material, one form of which is soy flour. Another is "grits" and another is soy bean meal. The applicant prefers to employ a soy flour of a low fat expellor type. It is to be understood, however, that flour or other suitable fractions of vegetable material, equivalent for the purposes of the present invention, for instance, of other Leguminosae, are to be included in the term "vegetable" material or "vegetable" flour when referring to this constituent of the medium.

The soy material the applicant prefers to use at a concentration within the range from about .3% to about 1% by weight of the medium.

It will be understood that the corn steep liquor and soy bean material are complementary as regards quantity, so that when the amount of one is dropped within the limits expressed above, the amount of the other is raised. Therefore, the preferred total concentration of corn steep liquor and soy bean material is kept within the range from about .75% to about 1.5% by weight of the total medium.

Guanidine, urea, etc.

Where a constituent selected from the group consisting of guanidine and its substitution products, urea and its substitution products, and inorganic nitrates is employed, its concentration should be within the range from about .05% to about 1% with from about .08% to about .3% preferred. These concentrations are by weight of the medium, and are based on the presumption that the constituents are used in combination with corn steep, in combination with soy flour, or in combination with both these nutrients.

The carbohydrate and inorganic salts are conventional culture medium constituents and are employed within the range generally used for fermentation in antibiotic production. For instance, the carbohydrate, preferably glucose, should be present within the range between about .5% and about 2.5% preferably from about 1% to about 1.5% by weight of the medium. The inorganic salts, for instance, sodium chloride, should be present at a concentration within the range from about .1% to about 1% with from about .4% to about .8% preferred.

The calcium carbonate which is used in the deep culture as a buffering agent, and which may be used in this relationship along with the other inorganic salts at a concentration effective to buffer acid formed, so that the pH is maintained within the range from about 6 to about 9, is generally kept within the range from about .1% to about 1%.

Example

To illustrate the invention in more detail, an example is given of a specific embodiment. The data are intended in an illustrative and not in a restrictive sense.

A culture medium was made up of the following constituents in the proportions given.

|  | Per cent |
|---|---|
| Glucose | 1 |
| Corn steep liquor ("Staley No. 14") by volume | .5 |
| Soy flour ("Livingston" brand of the Dominion Linseed Oil Co.) | .3 |
| Sodium chloride | .5 |
| Sodium nitrate | .1 |
| Calcium carbonate (buffer) | .2 |
| Water | Balance |

1500 gallons of this medium were prepared using Montreal (St. Laurent district) tap water, in a 2500 gallon low-carbon steel fermentor equipped for aeration and agitation.

The medium was sterilized for about 30 minutes at about 121° C. and then cooled. The cooled medium was inoculated with about .6% by volume of a 4-day old culture (whole liquid culture) of a specially selected high-producing strain of Actinomyces griseus Waksman No. 10, produced by growing the organism in a smaller scale deep culture vessel on the medium of this example. Fermentation was caused to proceed at about 24° C. with aeration. The pH of the medium at the start of incubation was about 7.1. During the course of the fermentation, a solution of octadecanol in lard oil was introduced in sufficient quantity to subdue frothing. Incubation was carried on for about 4 days with a good yield of antibiotic substances, as determined by conventional microbiological methods.

Discussion of example

This is a typical example of a large scale deep culture run. It will be understood, of course, that the concentrations and conditions may vary as elaborated above. In a run of this type, the applicant likes to maintain pH at the start of the fermentation within the range from about 6.5 to about 7.5. The applicant also prefers to harvest the antibiotic substances within about 40 to about 120 hours incubation. The air supply may vary, but it will be understood that aeration must be effected to encourage growth of the aerobic organisms and determination of the particular range of air supply for each type and size of vessel is experimental. The applicant prefers to employ aeration at a rate from ½ volume to 1 volume of the culture medium of air per minute.

Advantages and modifications

It is thus seen that the objects of the invention, namely, the provision of an improved method of producing antibiotic substances by the growth of Actinomyces griseus, are achieved. Other advantages will become apparent to those skilled in the art.

It will be understood that, without departing from the spirit of the invention or the scope of the claims, various other modifications may be made in the specific expedients described. The latter are illustrative only and not offered in a restrictive sense, it being desired that only such limitations shall be placed thereon as may be required by the state of the prior art.

The sub-titles used throughout the specification are merely to simplify reference thereto and should otherwise be disregarded.

I claim:

1. In a process of producing streptomycin by growing Actinomyces griseus in a deep culture medium with vigorous aeration and recovering streptomycin from the medium, the improvement which comprises growing Actinomyces griseus in a culture medium containing corn steep liquor and soy bean flour in synergistic relation as sources of organic nitrogen, whereby the culture medium tends to become acid in the early stages of growth, buffering the culture medium, and harvesting the streptomycin at a pH not greater than 9, the culture medium at maximum growth having a potency per milliliter greater than the sum of the potencies of media under like conditions of growth containing respectively corn steep liquor and soy bean flour alone as sources of organic nitrogen.

2. A process according to claim 1 in which corn steep liquor and soy bean flour are the sole organic sources of nitrogen.

3. A process according to claim 1 in which during the fermentation the pH is maintained within the range from 6 to 9 by the addition of calcium carbonate.

4. A process according to claim 1 in which the corn steep liquor is present at a concentration within the range from .1% to 1% by volume of the medium, the soy bean flour is present at a concentration within the range from .3% to 1% by weight of the medium, and the vigorous aeration is continued for a period of 40 to 120 hours while the temperature is maintained within the range from 22° C. to 35° C.

PAUL CHANDOS TRUSSELL.

REFERENCES CITED

The following references are of record in the file of this patent:

UNITED STATES PATENTS

| Number | Name | Date |
|---|---|---|
| 1,611,700 | Waksman | Dec. 21, 1926 |
| 2,422,230 | Foster | June 17, 1947 |
| 2,449,866 | Waksman | Sept. 21, 1948 |
| 2,461,922 | Rake | Feb. 15, 1949 |

OTHER REFERENCES

Schatz et al., "Streptomycin . . ." Proc. Soc. Biol. and Med., Jan., 1944, pp. 66 to 69.

Waksman, Jr. Am. Pharm. Assn. XXXIV, No. 11, Nov., 1945, page 275.

Schatz et al., Proc. Natl. Acad. Sci., 31:5 May 15, 1945, pp. 129 to 137.

Levine, Compilation of Culture Media, Wms. and Wilkins, 1930, page 770.